United States Patent [19]

Morstad

[11] Patent Number: 4,702,573
[45] Date of Patent: Oct. 27, 1987

[54] VARIABLE POWERED CONTACT LENS

[76] Inventor: David P. Morstad, 906 20th St., NW., Minot, N. Dak. 58701

[21] Appl. No.: 899,869

[22] Filed: Aug. 25, 1986

[51] Int. Cl.⁴ .......................... G02C 7/04; G02C 7/06
[52] U.S. Cl. ................................. 351/161; 351/160 H
[58] Field of Search ............... 351/160 R, 160 H, 161, 351/162

[56] References Cited

U.S. PATENT DOCUMENTS

| | | | |
|---|---|---|---|
| 3,279,878 | 10/1966 | Long | 351/161 |
| 3,300,909 | 1/1967 | Cooper et al. | 361/161 |
| 3,472,581 | 10/1969 | Bronstein | 351/161 |
| 3,485,556 | 12/1969 | Naujokas | 351/161 |
| 3,684,357 | 8/1972 | Tsuetaki | 351/161 |
| 4,174,156 | 11/1979 | Glorieux | 351/161 |
| 4,199,231 | 4/1980 | Evans | 351/161 |
| 4,324,461 | 4/1982 | Salvatori | 351/161 |
| 4,418,991 | 12/1983 | Breger | 351/161 |

Primary Examiner—Bruce Y. Arnold
Assistant Examiner—Scott J. Sugarman
Attorney, Agent, or Firm—Zarley, McKee, Thomte, Voorhees & Sease

[57] ABSTRACT

A soft contact lens of soft opthalmic plastic material with an anterior portion resiliently deformable by movement of the eye. The lens is of the scleral-corneal type, and has a base-down prism portion which moves under the lower eyelid. When the eye gazes downwardly and inwardly, pressure of the lower lid on the thickened portion of the lens causes a bulging of the anterior portion of the lens near the center, creating an increase in diopter power. A slab-off bevel of the lens sides shapes the bulge into proper spherical condition for clearer vision.

6 Claims, 4 Drawing Figures

VARIABLE POWERED CONTACT LENS

TECHNICAL FIELD

This invention relates generally to contact lenses, and more particularly to soft contact lenses having multiple focal lengths.

BACKGROUND OF THE INVENTION

Contact lenses have been utilized for many years for the correction of various visual disorders. However, contact lenses have been less successful in the treatment of presbyopia. Presbyopia is characterized by loss of elasticity of the crystalline lens, and hence, loss of the ability of the eye to adjust to clearly see objects which are close and also those which are more distant.

Two common methods for correcting presbyopia are the use of bifocal eyeglass lenses and bifocal contact lenses. Eyeglass lenses generally have two portions ground for two viewing distances. Since the eye will move in relation to the lens, the patient can easily view through either lens.

Two types of multi-focal contact lenses are presently known. One type is quite similar to eyeglasses, in that it moves relative to the eye in order to place the correct portion of the lens over the pupil for viewing. Such lenses are generally categorized as translating lenses; one such lens being described in U.S. Pat. No. 4,418,991 to Breger. These lenses have a lower portion which is engaged by the lower eyelid when the patient looks down, causing the lens to move upwards on the cornea relative to the pupil. Translating lenses are difficult to fit because the amount of movement of the lens will vary for each patient, making it difficult to determine the appropriate height of the bifocal segment.

Soft contact lenses are typically of a diameter large enough to extend beyond the cornea and into the scleral area. A thick peripheral portion fits into the natural notch created in the limbal area where the flatter scleral meets the steeper cornea. Such lenses can be of the translating type (described above), or of the simultaneous type. Simultaneous type of lenses, one being described in U.S. Pat. No. 4,199,231 to Evans, utilize a lens which does not move on the cornea, but rather causes the light rays to focus within a specific range forward and behind the retina. Such lenses require an increase in the distance prescription power for normal distance viewing in order to bring the near vision focal point within an acceptable range. This, in affect, will slightly blur the distance vision, since the focal point will be moved from the retina to a point slightly beyond the retina. Obviously, it is much more desirable to have the focal point of light rays from an object at any distance to be focused directly on the retina, and not merely within an "acceptable range" of the retina.

It is therefore an object of the present invention to provide an improved variable power contact lens.

Another object is to provide a variable power contact lens which is neither translational nor simultaneous and therefore suffers none of the problems associated with those lenses.

Yet another object of the present invention is to provide a contact lens which will provide a variety of focal lengths through the same portion of the lens.

These and other objects will be apparent to those skilled in the art.

SUMMARY OF THE INVENTION

A soft contact lens is provided which is comprised of soft, opthalmic plastic material which is resiliently deformable by movement of the eye. The lens is of the scleral-corneal type, and has a base-down prism portion which moves under the lower eyelid. When the eye gazes downwardly and inwardly, pressure of the lower lid on the thickened portion of the lens causes a bulging of the lens near the center, creating an increase in diopter power. A slab-off bevel of the lens sides shapes the bulge into proper spherical condition for clearer vision.

DESCRIPTION OF THE PREFERRED EMBODIMENT

Figure 1:
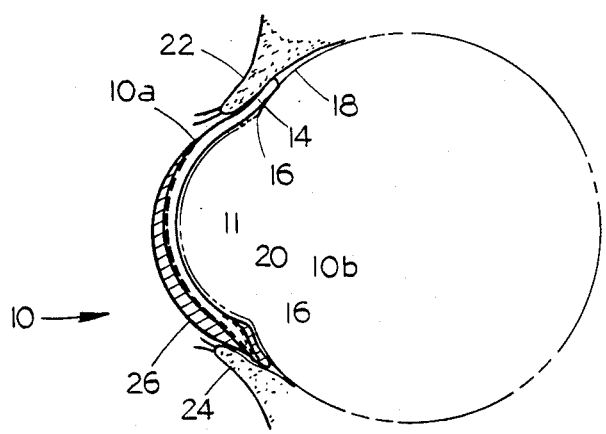
FIG. 1 is a diagrammatic view of the present invention with a conventional scleral-corneal contact lens shown in broken lines. Structure added to the conventional lens to form the present invention is shown in cross-hatching.
Figure 2:
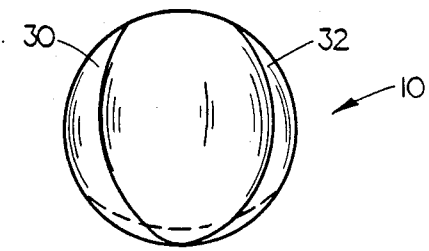
FIG. 2 is a front elevational view of the contact lens of this invention, shaped for the right eye of a person.

Referring now to the drawings, in which the reference numerals describe similar or corresponding parts throughout the several views, the improved contact lens of this invention is designated generally at 10 in FIG. 1, with a prior art contact lens 11 shown in broken lines. Additional structure added to prior art lens 11 to form the lens 10 of this invention, is shown crosshatched.

Like prior art contact lenses, the lens 10 of this invention is made with a thickened area 14 around its perimeter which fits into the natural notch created in the limbal area 16 where the flatter scleral 18 meets the steeper cornea 20. The anterior face 10a of the contact lens 10 is smooth, for comfort under the upper and lower eyelids 22 and 24, respectively.

The lower anterior portion of the lens is thicker than conventional lenses, and has a base-down prism 26, the purpose of which is described in more detail hereinbelow.

Figures 3, 4:
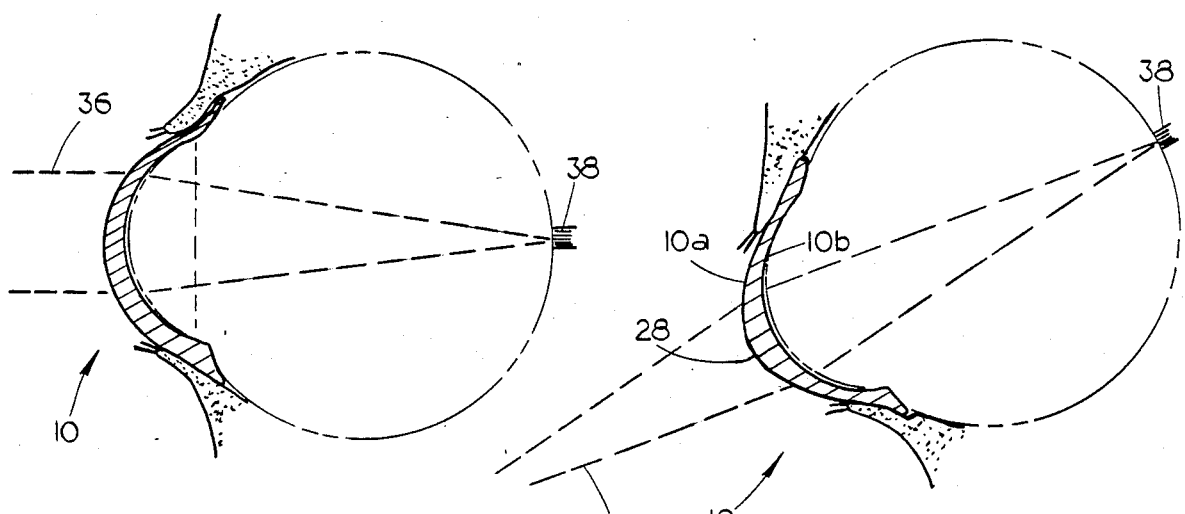
FIG. 3 is a diagrammatic view of an eye with the contact lens of the present invention thereon, the eye being focused for distant vision.
FIG. 4 is a diagrammatic view of an eye with the contact lens of the present invention thereon, the eye being focused for near vision.

The lens is composed of a soft, opthalmic plastic material which is resiliently deformable, and is thereby caused to deform with a slight bulge 28 at the center of the lens when pressure from the lower eyelid is exerted on the lens (see FIG. 4). One material capable of meeting the desired deformable characteristics is a high water content hydrogel. Other materials, such as a very soft silicone, could also be used with this invention. Bulge 28 creates an increased thickness and smaller radius curve in lens 10, and thereby increases the diopter of the lens 10 at bulge 28.

In order to shape bulge 28 into the proper spherical shape, a slab off, or bevel, on both the temporal 30 and nasal 32 sides of the anterior surface 10a of the lens 10 are necessary. The temporal bevel 30 must be slightly wider (when viewed in front elevation) than the nasal bevel 32 since the opening in the eye socket is slightly wider on the temporal side. Bevels 30 and 32 begin along the upper perimeter of lens 10, spaced away from the center upper point. Bevels 30 and 32 widen (in front elevation view) to their widest point approximately half way down the lens 10, and then narrow again at the bottom. Bevels 30 and 32 increase in steepness and merge with the perimeter of the lens approximately at the center of the bottom of the lens. This bevel structure not only serves to shape the bulge 28, but also helps to keep the lens 10 from rotating on the eye. The close fit and additional surface area against which the lower eye lid 24 will be pushing prevents rotation and helps to center the upward pressure of the lower lid when gazing downward.

A lower bevel 34 on the posterior surface 10b of lens 10 aids in easing lens 10 into the lower fornix of the eye, and also aids in holding lens 10 from translation upward.

The lens 10 of this invention utilizes known characteristics of the anatomy of the eye to assist in the deformation of the lens 10. Upper lid 22 is firmer than lower lid 24, while lower lid 24 is more loose and has slightly less room than upper lid 22. Thus, insertion of the contact lens 10 will cause the space under the lower eyelid 24 to be immediately filled by prism portion 26 of lens 10. Since near vision requires the eyes to move not only downwards but also toward the nasal fornix, this will cause additional pressure to assist in creating bulge 28 on lens 10.

Since the eye blinks by moving only upper lid 22, the lens will not change shape or power during this natural phenomena, thus eliminating one of the problems associated with some translational lenses.

FIGS. 3 and 4 diagrammatically show the changes which occur when the viewer directs his vision from a straight, distant view (FIG. 3) to a downward, near view (FIG. 4). Light rays 36, from a distant source, will pass through lens 10 and focus on retina 38. Thus, lens 10 is manufactured to correct the distance vision of the wearer in its "normal", undeformed shape. In order to view a closer object, the eye is moved downwardly and inwardly until lens 10 has a bulge 28 of the appropriate curvature so that light rays 40 are bent at a steeper angle and focused on retina 38. Thus, the natural movement of the eyes inwardly upon viewing a nearer object will actually help vary the power of the lens to maintain objects in focus. Because the lens 10 is made of a soft, resiliently deformable material, the lens 10 will return to its original shape as the eye gazes straight ahead for distance vision.

It can therefore be seen that an infinite variety of powers and foci are available with this lens 10, making vision clear continuously from distant vision to very near vision. For this same reason, a nearly universal lens is possible with the present invention. Those who need only slight correction need only gaze slightly downward to obtain the necessary correction. Those who need larger amounts of correction could use the same lens by gazing downwardly (and inwardly) at a steeper angle for near vision. Obviously, a more "custom" fit is also possible. For example, for those wearers who need only a slight correction, the thickness of the prism portion 26 is less than for those who require greater correction.

Because of the thickness, of the prism, lens 10 will help to mask smaller astigmatic errors. For higher astigmatic errors, a toric surface could be made on the posterior surface 10b of lens 10.

It can therefore be seen that this invention fulfills at least all of the above objectives.

What is claimed is:

1. A contact lens for non-rotational, non-translational orientation in the eye of the wearer, comprising,
    a soft, resiliently deformable opthalmic plastic material lens;
    said lens having a posterior surface conforming to the corneal surface of the wearer's eye and having a perimeter area extending upon the scleral surface of the wearer's eye;
    said lens having a front surface with a radius adapted to correct distance vision of the wearer;
    said lens having a base-down prism on the anterior surface, with a thickness such that pressure from the lower eyelid, when the eye gazes downwardly and inwardly, will cause the lens to resiliently deform to create a thickened bulge which reduces the radius of the lens near the center of the anterior surface;
    said lens having a beveled edge on its temporal and nasal sides, said bevels being on the anterior surface of the lens adapted to form a uniform, spheric bulge when said bulge is formed;
    said lens having a beveled lower edge on the posterior surface for a smoother fit within the lower fornix of the eye.

2. The contact lens of claim 1 wherein the lens material is a high water content gel, with an equalibriated water content of about 79%, and with a resiliently deformable anterior portion.

3. The contact lens of claim 1 wherein the temporal bevel is slightly wider in front elevational view than the nasal bevel.

4. The contact lens of claim 1, wherein the temporal and nasal bevels begin with a steep slope at points which are located spaced away from the center upper point of the lens, the slopes becoming shallower as the bevels widen in front elevational view, and becoming steeper again on the lower portion of the lens, said bevels ending at the lower center portion of the perimeter of the lens, the beginning points of the bevels being separated by a greater distance than the ending points of the bevels.

5. The contact lens of claim 1, wherein the posterior surface has a toric shape for wearers with high astigmatism.

6. The contact lens of claim 1, wherein the lens material is a very soft silicone material.

* * * * *